Sept. 3, 1940.    O. C. SCHMIDT    2,213,453
WASHER
Filed Dec. 5, 1938    3 Sheets-Sheet 1
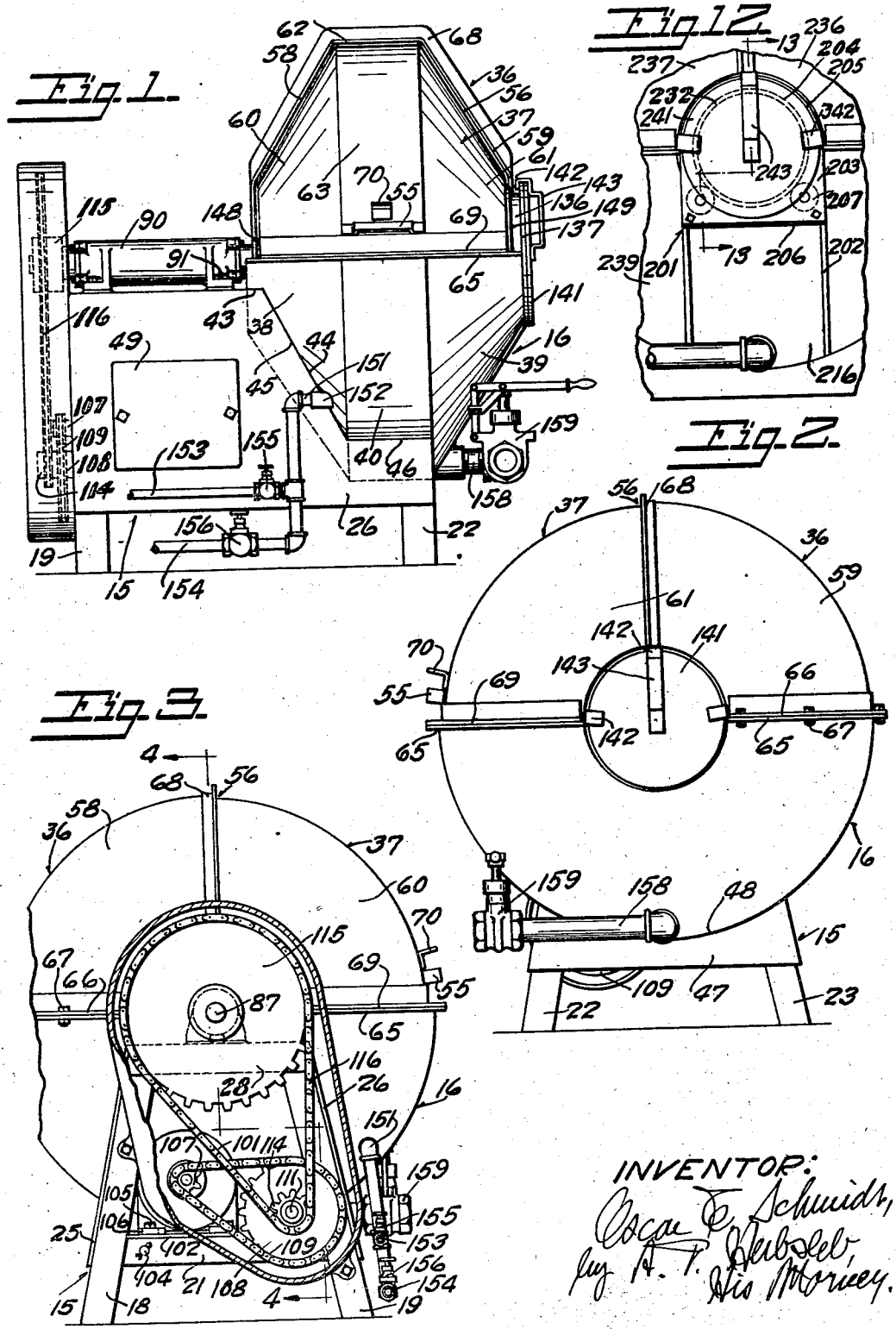
INVENTOR:
Oscar C. Schmidt, INVENTOR
Oscar C. Schmidt
His Attorney

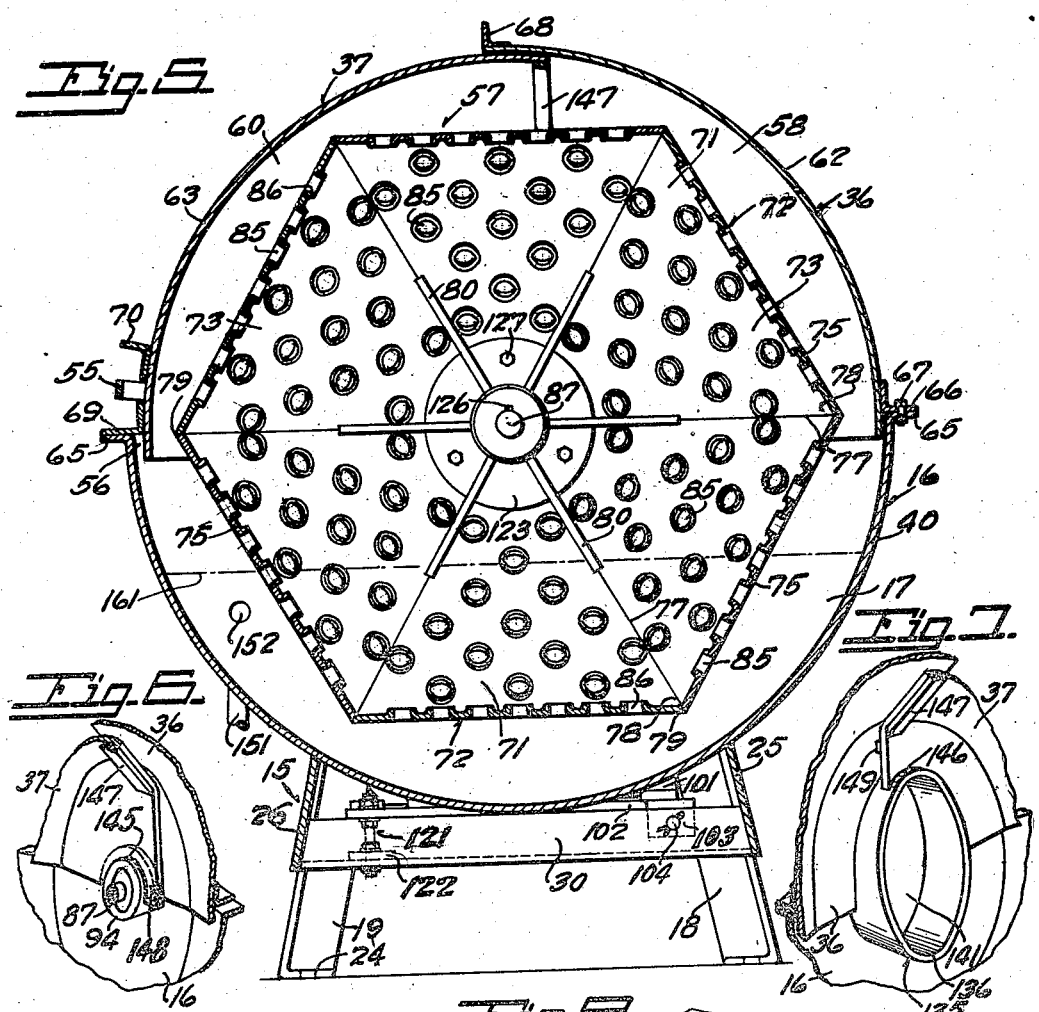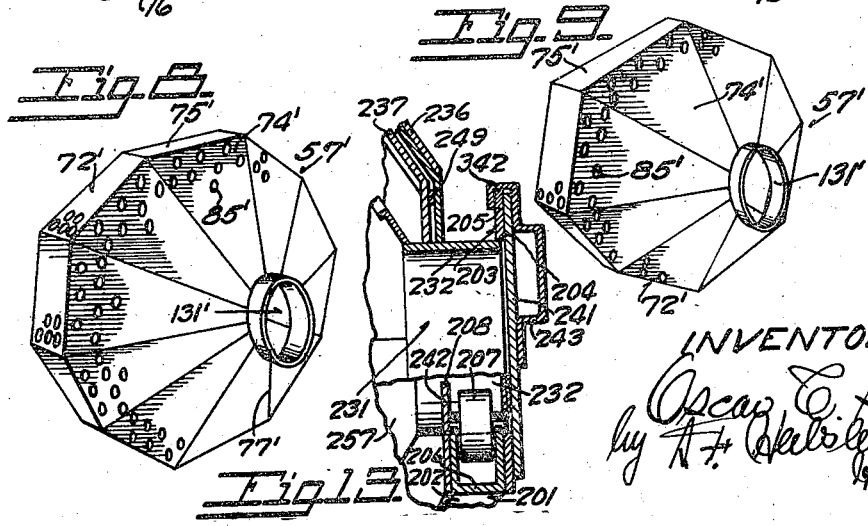

Patented Sept. 3, 1940

2,213,453

UNITED STATES PATENT OFFICE 2,213,453

WASHER

Oscar C. Schmidt, Cincinnati, Ohio, assignor to The Cincinnati Butchers' Supply Company, Cincinnati, Ohio, a corporation of Ohio Application December 5, 1938, Serial No. 244,042

6 Claims. (Cl. 17—43)

My invention relates to washers, especially to washers for washing tripe and other products, such as stomachs, chitterlings, lungs, feet, tongues, and the like, in the butchering industry.
It is the object of my invention to provide an improved washing machine, comprising a drum in which the material is subjected to contact with walls extending in various directions with relation to the rotary motion of the drum for resistant, rubbing and cleaning action upon the material.

My invention consists in dividing the drum into a plurality of angular sections about the axis of the drum and having end walls converging towards the outer circumferential or encompassing margin of the drum; that is, toward its outer boundary surrounding and farthest removed from its axis of rotation; further, in providing the drum with sectors having outer circumferential walls in relatively angular relation about the axis of rotation of the drum and end walls which converge toward said outer circumferential walls and are angularly arranged with relation to each other about the axis of rotation of the drum; further, in providing deflectors extending inwardly into the drum at the angles between such sectors; and, further, in providing such outer circumferential walls and such end walls with inwardly extending flanges which surround perforations in said walls and extend inwardly into the drum beyond the inner faces of said walls.

My invention consists, further, in providing a washer of the character mentioned with a drum having ends converging outwardly toward each other, by means of which the material during rotation of the drum is subjected to alternate squeezing and expanding actions, and in forming the drum in angular sections for acting in novel manner upon the material; further, in providing a drum having an end charging opening through which the tripe or other material is charged into the drum or rotor and withdrawn therefrom; further, in providing such an opening extending about the axis of rotation of the drum; and, further, in providing novel mounting means for the drum to permit the material to pass the axis of rotation of the drum and to provide for axial charging and discharging of the material.

My invention consists, further, in providing a novel casing which serves as a tank for the cleaning liquid in which the drum rotates, and having ends which converge toward the outer margin of the tank, and conform in general cross-sectional contour with the cross-sectional contour of the drum; further, in providing the tank with an end opening in line with the end charging opening of the drum for charging the tripe or other material into the drum and withdrawing the same therefrom; further, in providing novel means for mounting a movable section of the cover of the tank; further, in providing novel means for supporting the drum and the tank; and, further, in providing novel means controlling the height of washing liquid in the tank and for discharging the same from the tank.

The invention will be further readily understood from the following description and claims, and from the drawings, in which latter:

Fig. 1 is a side elevation of my improved device.

Fig. 2 is an end elevation of the same, viewed from the charging end.

Fig. 3 is an end elevation of the same, viewed from the driving end, and partly broken away.

Fig. 5 is a cross-section of the same, taken in the plane of the line 5—5 of Fig. 4.

Fig. 6 is an inner perspective view of a detail of the mounting means for one end of the movable cover, partly broken away.

Fig. 7 is a similar view of the mounting means for the other end of the movable cover.

Figs. 8 and 9 are perspective views of modifications of the drum, showing drums having different numbers of angular sections.

Fig. 12 is a front elevational detail view showing a modification; and,

Fig. 13 is a vertical cross section of the same taken on the irreular line 13—13 of Fig. 12.

Figure 4:
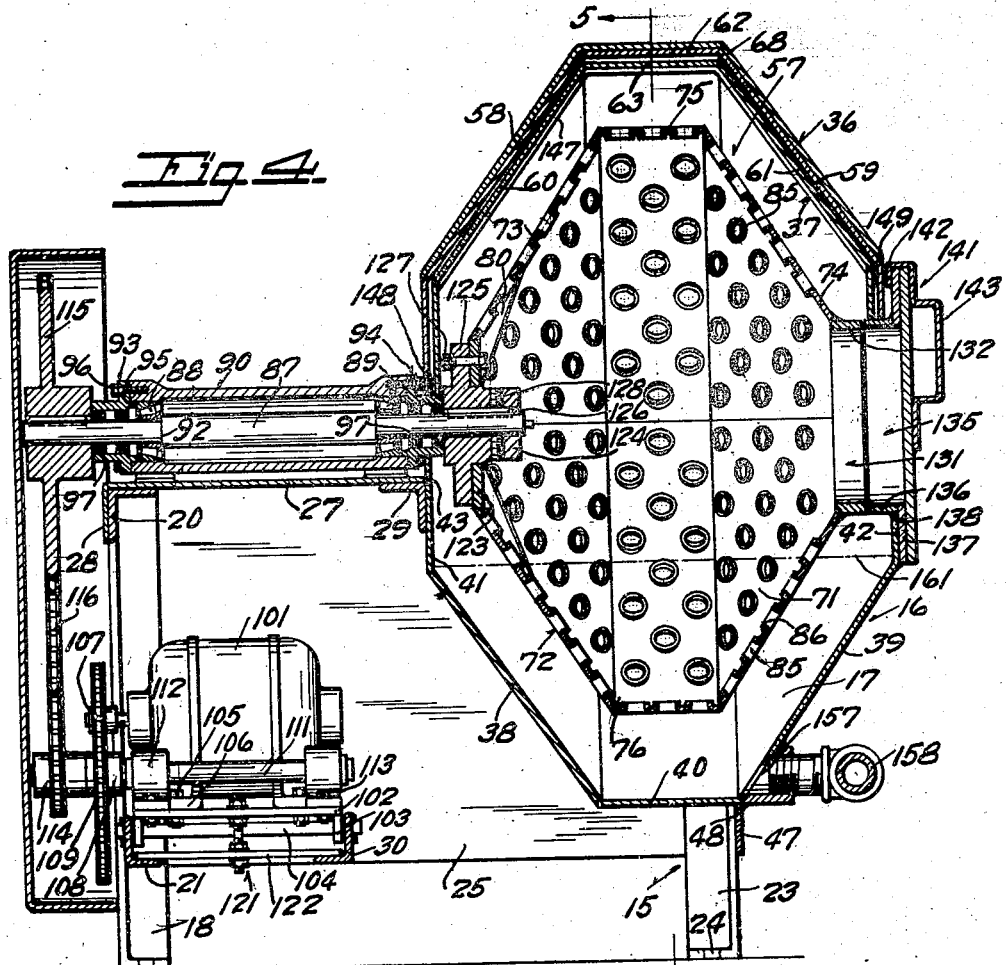
Fig. 4 is a vertical section of my improved device, taken in the plane of the irregular line 4—4 of Fig. 3.

The frame 15 of the machine supports a tank 16 in which the washing liquid 17 or bath is contained. The frame comprises side uprights 18, 19 at the rear end of the frame, which converge toward the top of the frame, where they are rigidly connected by a stringer 20. A lower stringer 21 is rigidly connected with the lower portions of the uprights. The frame further comprises front uprights 22, 23 which converge upwardly. The lower ends of the respective uprights serve as legs and have inturned feet 24 provided with holes to receive lag screws to hold the machine in place.

Upwardly and inwardly slanting side plates 25, 26 are rigidly connected with the uprights and have an intermediate top plate 27 therebetween, which is provided with a downturned flange 28 rigidly connected with the stringer 20. An intermediate upper stringer 29 is rigidly connected with the inner end of the top plate, its ends being rigidly connected with the side plates. An intermediate lower stringer 30 is rigidly connected at its ends to the side plates.

The tank 16 has a stationary cover 36 and a movable cover 37. The tank has converging end walls 38, 39, an intermediate longitudinally extending and cross-sectionally arcuate wall 40 at its outer circumference, and central end walls 41, 42, all of which are rigidly connected together. The tank preferably has the form of the sectors of truncated double cones whose bases are presented toward each other and have the sector of a cylinder between them.

The top plate 27 is provided with a recess at its inner end, the wall 43 of which is located about the inner truncated end of the tank, encompassing the inner end wall 41 of the tank and the inner end of the inner truncated conical wall 38 thereof. The side plates 25, 26 are respectively provided with recesses 44, at their front ends, each of which is provided with a forward outwardly and downwardly slanting wall 45, and an inwardly presented lateral wall 46, the balance of the inner truncated conical wall 38 registering with said walls 45, and the cylindrical wall 40 registering with the lateral walls 46. The inner end wall 41, the inner truncated wall 38 and the arcuate wall 40 of the tank are rigidly connected with the walls 43, 45, 46 in the top plate 27 and side plates 25, 26. A front cross plate 47 has a recess 48 at its upper edge, the wall of which forms a seat for the front end of the arcuate wall of the tank. This cross plate is rigidly connected with said tank at said arcuate wall and with the front uprights 22, 23. All of the rigid connections herein mentioned may be made by electrical or other welding. The frame and the tank may be integrally connected to form a rigid body. The side plate 26 is provided with an opening giving access to the interior of the frame and the devices therein. This opening is normally closed by a closing plate 49 releasably secured to said side plate.

The tank 16 is provided with a cover having a stationary section 36 and a movable section 37, the latter being provided with a handle 55 for moving the movable cover to open or close the opening 56, through which access is had to a drum 57 rotatable in the tank and to the interior of the tank. The stationary cover or section 36 and the movable cover or section 37 of the cover respectively have converging end walls 58, 59 and 60, 61 and intermediate longitudinally straight and cross-sectionally arcuate walls 62, 63 at their outer circumference. These sections of the cover preferably respectively have the form of the sectors of truncated double cones whose bases are presented toward each other and having the sector of a cylinder between them. The sections of the cover preferably telescope one within the other when the movable section is opened. The tank and the covers when closed are formed preferably substantially like a pair of truncated cones having their bases presented toward each other and having a cylinder between said bases and having their apexes truncated. The upper edge of the tank is provided with a flange 65. The lower edge of the stationary cover 36 is provided with a flange 66 about the same, which is releasably secured to the rear portion of the flange 65 by bolts and nuts 67. The front margin of the stationary cover is provided with a flange 68 for strengthening the same. The normally lower margin of the movable cover is provided with a flange 69, which rests on the front portion of the flange 65 of the tank when the cover is closed. The movable cover is provided with a stop 70 which coacts with the front margin of the stationary cover for limiting inward movement of the movable section. The flanges 65, 66, 68 and 69 extend along the cylindrical portion and the slanting end portions of the walls of the tank and covers and terminate preferably at the truncated end portions of said tank and covers.

The drum 57 has a cavity 71 in which the tripe or other material is arranged to be placed for being washed. The drum comprises a plurality of sections 72 respectively having slanting end walls 73, 74 which converge towards the outer circumference of the drum, and are preferably connected by an outer circumferential wall 75, preferably substantially parallel with the axis of the drum.

Angles 76 are formed between the converging end walls 73, 74 and the circumferential walls 75. Angles 77 are formed between adjoining margins of the adjoining converging end walls, and angles 78 are formed between adjoining margins of adjoining circumferential walls 75.

The sections 72 are preferably angular sections of the drum. The edges of the angular sections are connected with each other, as by joints 79, which may be welded joints. The drum is shown as having six such angular sections in Fig. 5, eight in Fig. 9, and ten in Fig. 8; the number of angular sections in a drum depending on the diameter of the drum. Smaller drums, for example, twenty-four to thirty-six inches in diameter, are preferably provided with six such angular sections; larger drums, in the neighborhood of forty-eight inches in diameter, are preferably provided with eight such sections, and still larger drums up to approximately sixty inches in diameter, are preferably provided with ten such sections. The elements of the modifications shown in Figs. 8 and 9 are identified by similar but primed reference numerals. The angles between sections aid in the cleaning operation of the tripe or other material, and the number of sections in a drum is such as to retain distinct angles between sections. The drums are at the angles 77, 77' preferably provided with strengthening ribs 80, which preferably form deflectors to aid in cleaning by contact of the tripe or other material therewith.

The walls of the drum are provided with perforations 85, preferably so formed that the metal moved in stamping such perforations into the blanks forming the respective angular sections of the drum, projects beyond the faces of said blanks (Figs. 4 and 5), and forms inwardly projecting walls 86 surrounding the respective perforations, and provides annular flanges surrounding said perforations extending inwardly from the inner face of the drum, which act as scrapers for the tripe and other material. These perforations and scrapers preferably extend throughout substantially the areas of the walls of the drum and are preferably close together and of such size as to act upon and bend the upstanding walls of the honey-comb portions of the tripe, and to scrape and remove the fat, slime and deleterious substances from the tripe and other materials, especially during the contracting and expanding movements of the tripe and other materials into and out of the converging spaces between the converging walls of the drum.

I prefer to mount the drum in such manner that the tripe and other materials in the drum may move across the axis of rotation of the drum, whereby freedom of movement of the tripe and other materials in the drum is enhanced, and the force of dropping of the same in the drum is increased, and washing action is imparted to the tripe and other material which would otherwise not take place, and I therefore mount the drum on a shaft which does not extend through the drum but projects solely from one end of the drum to support and rotate the drum.

Thus there is a shaft 87 which is mounted in bearings 88, 89, shown as roller bearings, in a housing 90 secured to the top 27 of the frame by means of bolts 91. These rollers are preferably radial and end thrust rollers, inclined in opposite directions at the respective ends of the shaft, the inner races of the bearings being held outwardly by shoulders 92 on the shaft, and the outer races of the bearings being held inwardly by the inner ends of housing ends 93, 94, flanges 95 of which are respectively secured to the respective ends of the housing 90 by bolts 96. The housing ends respectively contain lubricant seals 97 to prevent seepage of lubricant and cleansing liquid past the same, to protect the bearings and the contents of the tank.

The shaft is suitably driven, as by means of an electric motor 101 adjustably mounted on a motor plate 102 having lugs 103 pivoted on a pivot rod 104 supported in the stringers 21 and 30 of the frame. Bolts and nuts 105 adjustably secure the feet 106 of the motor frame to the motor plate. The motor is provided with a pulley 107, about which and a pulley 108 a flexible driving band 109 is located to drive the pulley 108. The latter pulley is fixed to an intermediate shaft 111, mounted in bearings 112 adjustably secured to the motor plate by bolts and nuts 113. This shaft also has a pulley 114 fixed thereto, and the shaft 87 has a pulley 115 fixed thereto. A flexible driving band 116 is received about the pulleys 114, 115 for driving the shaft 87. An adjustable connection 121 between the motor plate and a supporting stringer 122 of the frame is provided for adjusting the motor plate and the tension of the flexible drive connection 116. The pulleys may be sprocket wheels and the flexible driving bands may be sprocket chains thereabout. The pulleys and the flexible driving connections form speed reducing gearing between the motor and the drum.

One end of the drum is provided with a central end plate 123, which forms an attaching plate, and is fixed to the inner ends of the angular end walls of the drum at that end, as by welding or other suitable means, the inner ends of the strengthening ribs 80 being also preferably secured to the inner face of the attaching plate, as by welding, so as to strengthen the drum at its journaled end. A collar 124 is provided with a flange 125, and is keyed to the shaft 87 by a key 126, so as to rotate with the said shaft. The drum is secured to the flange 125 by means of nuts and bolts 127, of which there may be a suitable number about the axis of rotation of the drum. Set screws 128 fix the collar to the shaft.

The collar 124 and its attachment to the drum forms a hub for the drum received about the shaft 87. The shaft is held endwise by the roller bearings 88, 89, to fix the position of the rotary path of the drum and to provide free rotation between said hub and the inner end of the housing end 94.

The drum is provided with a charging opening 131 surrounded by a wall 132, shown as a band. This charging opening is at the axis of rotation of the drum and surrounds the same. The proximate ends of the sections of the slanting outer end wall 74 of the drum are secured to the wall 132, as by welding. The wall 132 is preferably annular, the proximate ends of the sections of said outer end wall being correspondingly formed.

The outer central wall 42 of the tank is provided with a charging opening 135, which is preferably in an annular band 136, forming the wall of said opening and provided with an outer annular flange 137. The outer central end wall 42 of the tank is at its central portion provided with a recess 138 for receiving the lower portion of the band 136, the flange 137 of the latter being secured to this end wall of the tank, as by welding. The charging band 136 surrounds and is spaced from the axis of rotation of the drum.

A closure 141 is provided for the charging openings and is exemplified as a plate provided with upper and lateral hooks 142 extending inwardly beyond the closure plate and arranged to be hooked over the outer margin of the flange 137. The closure plate is provided with a handle 143 for manipulating the same.

The movable cover is pivoted about the axis of rotation of the drum. It has an inner bearing 145 (Fig. 6) received partway about the outer periphery of the housing end 94 and an outer bearing 146 (Fig. 7) received partway about the wall 136 of the charging opening of the tank, these bearings being concentric with each other and so arranged that the same may be lifted off of their respective journal supports, after the stationary portion of the cover has been removed. The inner margins of the movable cover may be provided with a strengthening strip 147. The outer faces of the central end walls of the movable cover (Figs. 4, 6 and 7) are preferably provided with riding strips 148, 149 respectively arranged arcuately about the pivotal axis of the cover to separate the movable cover endwise from the stationary cover and to provide ease of movement of the movable cover.

A suitable washing liquid is provided in the tank, as by means of an inflow pipe 151, threaded into a receiving port 152 in the tank and having pipes 153, 154 connecting therewith, the latter being respectively steam and water pipes provided with valves 155, 156 for regulating the proportions of fluid supplied to the tank and the heat of the washing liquid in the tank. An outflow port 157 is provided in the bottom portion of the tank and has an outflow pipe 158 connected therewith provided with a gate valve 159 for shutting off and regulating the outflow of liquid from the tank. The normal height of the bath or washing liquid in the tank is represented by the dotted line 161.

Figure 10:
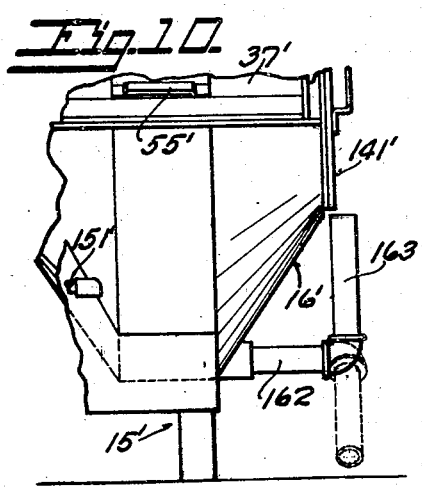
Fig. 10 is a side elevation, partly broken away, showing a modification of the discharging means for the washing liquid, with the end of the discharge pipe in normal position in full lines and in discharging position in dotted lines.
Figure 11:
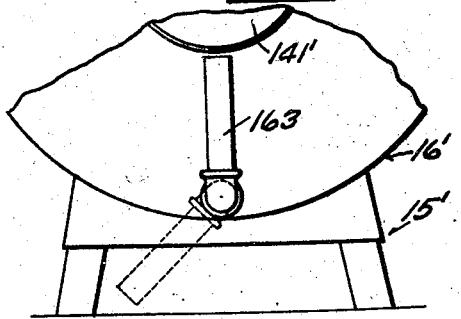
Fig. 11 is an end elevation of the same.

A modification, shown in Figs. 10 and 11, (in which the elements are indicated by similar but primed reference numerals), is provided with means by which the level of washing liquid in the tank is automatically maintained. The outflow pipe 162 is provided with a normally upwardly extending branch 163, which is open at its upper end at the desired level of liquid in the tank, excess washing liquid flowing out of this open upper end, the supply of liquid, obtained through pipes and valves as herein just described, being so regulated as to maintain the level of the liquid in the tank. The upwardly extending branch 163 is pivoted on the outflow pipe 162 and is arranged to be tilted downwardly, so as to extend downwardly below the level of the tank, as shown in dotted lines in Figs. 10 and 11, for discharging washing liquid from the tank.

In the operation of my improved device, the material, for instance, tripe, is charged into the drum through the axial feeding opening 135 in the tank and the axial feeding opening 131 in the drum. It will be noticed that the walls of these openings are shown close together, end to end, so as to practically makes a continuous wall. The drum is filled with the material to be washed to about the level of the lower portion of these openings, which may take place during rotation of the drum, thus subjecting the material to the action of the bath during charging of the same and preliminarily coating all surfaces of the material with the cleaning liquid, thereby aiding in the cleaning and expediting the cleaning operation.

The drum having been provided with the charge of tripe or other material to be washed, the closure or gate 141 is closed and rotation of the drum continues, or rotation of the drum may now be initiated, the speed of rotation being such as is most suitable for the washing operation and suitable for the size of drum and the character of the material being washed.

During this rotation, the tripe, or other material, is carried with the movement of the drum and the material is moved through the washing liquid, which thoroughly surrounds all the surfaces of the material, and the material is carried with the drum in the direction of rotation of the latter, some of it sliding and rolling in the drum, causing friction and rubbing between the layers of tripe or other material, and between the tripe or other material and the walls of the drum. During these movements there is also contact between the tripe or other material and the angularly arranged section of the drum, whose walls are presented at various angles to the movements of the tripe or other material in directions different from the rotary movement of the drum, so as to cause additional rubbing between the surfaces of the tripe or other material and between the latter and the angular portions of the walls of the drum, all of which aids in cleaning the surfaces of the tripe or other material and in removing the deleterious matter held by such surfaces from the tripe or other material, and especially from the honey-combed and other recesses in the tripe.

During this action also there is rubbing contact between the material and the deflectors 80, causing rubbing action between the same, during which, as well as during the rubbing actions previously explained, there is movement between the surfaces of the tripe and other materials, and between the latter and the deflectors in the drum which are the result of differential movements between the same in the same directions and in reverse directions between the same, due, for instance, to reverse droppings of raised portions of the tripe or other material, and the relatively more rapid movements of the same during such droppings, all of which aids in the washing action upon the tripe. The cover is maintained closed during these operations, retaining the heat of the bath in the tank and preventing splashing during the scalding, scraping and cleaning operations.

This washing action is further enhanced by the inward projection (Figs. 4 and 5) into the drum of the walls of the perforations in the walls of the drum, acting with a scraping and cleaning function especially on the tripe, to wash the deleterious substances from the surfaces of the tripe and to cause projections of the walls of the perforations into the recesses in the surfaces of the tripe presented by the honey-combed formation of large portions of the tripe and to cause the bending of the walls of recesses in the tripe and the suction created by the co-action between said recesses and the recesses in the inner surface of the wall of the drum.

Much of the tripe and other material is carried with the drum during the rotation of the latter, the tripe dropping back into the lower portions of the drum and into the bath by gravity as the tripe and other material is rising, or the tripe and other material may be carried with the drum during its rotation so as to move with the drum until the tripe or other material reaches the upper portion of the travel of the drum, or during such travel, the tripe or other material which was raised, drops to the bottom portion of the drum, which causes a compacting and rubbing action, especially between the tripe so dropping and the layers thereof in the lower portions of the drum. The freedom of the interior of the drum from an obstructing shaft permits this action to the fullest useful extent.

Furthermore, the end walls of the drum are slanting and converging toward the outer portion of greater diameter of the drum. The tripe or other material by its weight seeks the lower portion of these converging walls and is squeezed together by its weight and the narrowing space between the converging walls, thereby compressing the material, especially tripe, and squeezing it together, as in squeezing a sponge, and causing cleaning movement between surfaces of the material, especially tripe, and the walls of the honey-combed formation thereof and their coaction with the converging walls of the drum. As the material, especially tripe, is moved upwardly with the drum during rotation of the latter, it will expand by reversal of the force of gravity, and the raised material, especially tripe, will forcefully drop to the lower portion of the drum, and in expanding and dropping, will cause reverse action between its surfaces, as when releasing the pressure on the sponge in cleaning the same, to be immediately followed by another squeezing action upon the same by its dropping and moving by gravity into the succeeding contracting lower portion of the drum, enhanced by the coaction between the wall of the drum and the same, due to the cross-sectional angular relations of such walls and the angular relations between the sections of the walls about the drum.

The inflow of washing liquid may continue during this action and the tank be partially or wholly drained at intervals, by operation of the valves in the inflow pipes and the operation of the valve in the outflow pipe, so as to cause discharge of the detrimental contents thereof, washed and cleaned from the material, or such discharge may be continuous through the top of the raised pipe extension 163, shown in Figs. 10 and 11, when the latter is employed, and the dumping of the used washing liquid be obtained by swinging such pipe section extension into lowered position, as shown in dotted line in said figures.

Making the tank of cross-sectional contour similar to the cross-sectional contour of the drum, but of larger dimensions, provides a body of washing liquid between the tank and the lower portions of the drum of substantially equal width throughout for controlling the movements of such washing liquid and the currents thereof due to rotation of the drum and the action of the material substantially in line with and contrary to such movements of the washing liquid, so as to induce currents in the washing liquid which will be most effective in the cleansing operation and will minimize movements of washing liquid beyond the sphere of action of the drum.

Upon thorough washing of the material, the closure or gate 141 is removed and the material withdrawn from the drum through the axial openings 131 and 135 respectively in the drum and in the tank, during rotation of the drum or after cessation of such rotation. The movable cover 37 may be opened during operation to expose the drum and to note the action of the tripe therein, and for inspection purposes. The drum and the interior of the tank may be readily cleaned by introducing suitable sprays into the tank through the opening 56 in the tank and through the perforations in the drum, as well as through the charging openings in the tank and the drum, during all of which the drum may be rotated in a bath of cleansing fluid in the tank.

Specifically, tripe may, by employment of my improved device, be thoroughly cleansed in a continuous operation. The tripe may be charged into the rotating drum through its axial opening into a scalding bath to scald and clean the tripe, the bath being agitated by the rotating drum to thoroughly mix its ingredients, and the tripe being subjected to the scalding and cleaning for a suitable length of time, said ten minutes, throughout which the drum is caused to rotate. The bath and its accumulated impurities are then discharged and a hot cleaning bath substituted for thoroughly cleaning the tripe, the rotations of the drum continuing during such change and thereafter, to thoroughly agitate the bath and clean the tripe, this cleaning continuing for a further suitable period of time of approximately ten minutes. The latter bath with its accumulated impurities is then discharged and a chilling rinsing bath substituted therefor and the tripe subjected to it for a further suitable period of approximately five minutes, during continuing rotation of the drum, whereupon the tripe may be pulled partially through the axial openings and spread and inspected while removing the same, all during continuing rotation of the drum, and, if any of the tripe is found to be not sufficiently clean, it may be pushed back into the drum for further cleaning.

After the cleansed and chilled tripe has been removed from the drum, through its axial charging opening, hot water or steam and cleaning ingredients are charged into the rinsing bath to prepare it for the next scalding bath for the next batch of tripe during further continuing rotation of the drum. The operation of the machine is continuous during and between cleanings of successive batches of tripe, resulting in great economies and insuring thorough cleansing.

The drums when cleaning tripe are rotated preferably at approximately an outer circumferential speed of some sixty-four hundred feet per minute. In practice the perforations of the drums may as an example be five-eighths to one and a half inches in diameter and distanced from each other in staggered relation so that their centers are one and a fourth to two and a half inches apart, and the walls of the flanges of the apertures extend one-eighth to three-eighths inches high.

If desired, the charging end of the drum may be provided with a supplemental bearing support. Such a support is exemplified in Figs. 12 and 13, in which similar parts are designated by similar reference numerals raised to the series 200. The central end wall 242 of the tank is provided with a bracket 201 fixed thereto and having strengthening ribs 202 fixed to the converging end wall 239 of the tank. A plate 203 extends upwardly from this bracket and is provided with a central opening 204 surrounded by a flange 205. This bracket is formed as a channel 206 in which bearing rollers 207 are located, the rollers having stub ends which are journaled in said sides of said channel.

The wall or sleeve 232 of the charging opening 231 of the drum 257 is extended axially outwardly through a registering opening 208 in the central end wall 242 and the central opening 204 to form a charging mouth for the drum. The wall or sleeve 232 rides on the rollers 207. The closure 241 is supported by its hooks 342 on the flange 205.

My improved device comprises simple means whereby large quantities of tripe and other material may be cleaned and inspected within small compass and during continuous operation, whereby parts within the drum which might retard cleansing action on the tripe are avoided, and whereby drums of large capacity may be mounted in the tank in overhanging relation and the charging and discharging of the drum may take place at a convenient elevation, and a continuous wall for the charging mouth into the drum be provided.

I claim:

1. In a washer of the character described, the combination of a tank, a drum rotatable therein, said drum having end walls which converge toward the outer portions of the drum about the axis of rotation of the drum, said tank being arranged about the lower portion of said drum, a cover on said tank above said drum, said tank and said drum having charging openings at the axis of rotation of the drum, and a closure for said charging opening in the tank, said openings respectively having walls proximate to each other to form a passageway for the material charged into and discharged from said drum, said wall of said charging opening of said tank being provided with a radially and outwardly extending flange about said last-named charging opening and spaced from said cover, said closure being provided with a hanging means extending into the space between said flange and said cover, and said hanging means being supported on said flange in manner to hold said closure in releasable closed relation to said last-named charging opening.

2. In a washer of the character described, the combination including a rotatable drum having end walls which converge toward the outer encompassing margin of the drum distanced from its axis of rotation and forming opposite radially converging walls about said axis of rotation, said end walls being provided with perforations having inwardly extending encompassing flanges which project toward each other in the converging space between said walls, and said drum having a material containing cavity which is free across its axis of rotation for the passage of material in said drum by gravity across said axis of rotation and compressively radially across said flanges, and being constructed to wedge and compressively enter the material in said drum between said converging end walls and said flanges extending therefrom at the lower outer portions of said drum, whereby the material is carried to the upper portions of the path of rotation of the drum by the combined wedging and entering actions of said opposite converging end walls and said opposite inwardly presented flanges thereon and drops from said upper portions through said unobstructed cavity across said axis of rotation for expanding the material and again contracting, wedging and gripping the material between the lower portions of the lateral converging opposite walls of the drum and said oppositely presented flanges extending therefrom.

3. In a washer of the character described, the combination of a tank, a material receiving drum rotatable therein and having frusto-conical end walls having their bases presented toward each other, a driving shaft for said drum extending outwardly endwise solely from one end of said drum to provide a material cavity in said drum which extends freely across the axis of rotation of said drum, said tank and said drum having openings about said axis at the other end of said drum, said drum having a sleeve projecting outwardly endwise from said opening therein and forming a continuation of said opening therein and registering with said opening in said tank and extending axially outward beyond said last-named opening, and supporting means on said tank and located outside said last-named opening to rotatively support said sleeve, said sleeve forming a charging mouth for said drum.

4. In a washer of the character described, the combination of a tank arranged to contain a bath of cleaning liquid, a rotatable drum to contain the material to be washed, and mounting means for said drum to rotatively support said drum with its lower portion in said bath in said tank, the said drum comprising end walls which are frusto-conical in form and have their ends of larger diameter presented toward each other and connections between said end walls at said last-named ends so that said end walls are located opposite each other and converge radially toward the outer encompassing margin of the drum, said drum containing a material cavity between said end walls, said opposite end walls being provided with perforations for ingress and egress of the cleaning liquid, and said perforations having inwardly extending marginal flanges presented toward each other on said opposite end walls, whereby upon rotation of said drum the material in said cavity being cleaned is wedged by gravity in the bottom of said drum between said converging walls and gripped in such wedged condition by said opposite inwardly extending flanges entering said material to move the material upwardly with said lower portion of the drum during upward rotation of the latter, said end walls being constructed to so hold the material during such upward movement by such combined wedging and gripping actions until released by the force of gravity acting on the material during and toward the end of upward movement of the latter, and said drum having free space in its interior transverse to and at its axis of rotation for passage of the material in said material cavity across said axis of rotation.

5. In a washer of the character described, the combination of a tank having end walls and being arranged to contain a cleaning bath, a material receiving drum having end walls which converge toward each other toward their outer peripheries and containing a material cavity between said end walls, proximate end walls of said tank and said drum having registering openings about the axis of rotation of said drum at one of the ends of said drum and said tank, said drum being provided with a sleeve projecting outwardly endwise from said opening therein and extending through said opening in said end wall of said tank, a bracket on said tank outside said end wall of said tank, and bearing means on said bracket outside said end wall of said tank coacting with said sleeve, said sleeve forming a charging mouth for said drum extending outwardly through said end wall of said tank into coactive position with said bearing means beyond the sphere of contact therewith by the cleaning bath in said tank.

6. In a washer of the character described, the combination of a tank having end walls and being arranged to contain a cleaning bath, a material receiving drum having end walls which converge toward each other toward their outer peripheries and containing a material cavity between said end walls, proximate end walls of said tank and said drum having registering openings about the axis of rotation of said drum at one of the ends of said drum and said tank, said drum being provided with a sleeve projecting outwardly endwise from said opening therein and extending through said openings in said end wall of said tank, a bracket on said tank outside said end wall of said tank, said bracket having an outer wall provided with an opening, bearing means on said bracket between said outer wall and said end wall of said tank coacting with said sleeve outside said tank, and the outer end of said sleeve being located in said last-named opening, said sleeve forming a charging mouth for said drum extending outwardly through said end wall of said tank past said bearing means and into said last-named opening beyond the sphere of contact with said bearing means by the cleaning bath in said tank, and closing means for said sleeve on said outer wall.

OSCAR C. SCHMIDT.